United States Patent [19]

Post et al.

[11] 4,085,926
[45] Apr. 25, 1978

[54] TAPE SPLICER

[75] Inventors: Herman D. Post, Great Neck; Edward Perper, Brooklyn; George Alexandrovich, Sr., Commack, all of N.Y.

[73] Assignee: Robins Industries Corporation, Commack, N.Y.

[21] Appl. No.: 675,055

[22] Filed: Apr. 8, 1976

[51] Int. Cl.² .............................................. B23Q 3/00
[52] U.S. Cl. .......................................... 269/295; 83/455
[58] Field of Search .......................... 269/290–295, 269/302.1, 303, 289, 228; 83/455; 156/502, 506

[56] References Cited

U.S. PATENT DOCUMENTS

| 2,552,148 | 5/1951 | Carson | 156/506 |
| 2,660,221 | 11/1953 | Simpson | 156/506 |
| 2,833,350 | 5/1958 | Merkur | 83/455 |
| 2,988,122 | 6/1961 | Stevens et al. | 269/228 |

Primary Examiner—Harold D. Whitehead
Assistant Examiner—Robert C. Watson
Attorney, Agent, or Firm—Michael J. Striker

[57] ABSTRACT

A tape splicer having a base, at least one groove extending longitudinally on said base and being of a predetermined breadth permitting insertion thereinto of a correspondingly wide tape to be spliced. A blade-guiding slot is provided in the groove to allow introduction thereinto of a blade, so that this blade moved along this slot will cut a tape laid along the groove. A pair of tiltable toggles is associated to the base. These toggles are located longitudinally of the groove and at opposite sides of the blade-guiding slot. At least one arm is comprised in each of the toggles and is provided with a tape-clamping means which is arranged so that it reaches, when the toggle is tilted, into the groove; thus, the pair of toggles engages with the tape-clamping means the tape laid into the groove thus securing a clean cut.

13 Claims, 3 Drawing Figures

TAPE SPLICER

BACKGROUND OF THE INVENTION

The invention relates to a tape splicer for cutting and splicing of tapes, for instance, in order to separate damaged portions thereof or to edit visual and sound tapes of music, speech, etc.

Various arrangements have been proposed for this purpose. For a variety of reasons these prior-art arrangements are, however, not fully satisfactory and further improvements are desirable.

SUMMARY OF THE INVENTION

It is an object of the present invention to overcome the shortcomings of the prior art.

It is another object of the present invention to provide a tape splicer wherein the tape is firmly kept in position during the splicing operation.

Still another object of the present invention is to provide a tape splicer of the types specified herein, in which a tiltable toggle is located at each side of a blade-guiding slot and a tape clamping means is provided on each toggle which, when the toggles are tilted, engage a tape received in a tape-groove and thus retains it in position during cutting.

An additional object of the present invention is to provide such a tape splicer which is suitable for use with tapes of different widths.

In accordance with the above indicated objects, and others which will become apparent hereinafter, the tape splicer of the present invention comprises, briefly stated, a base having a surface formed with at least one tape receiving groove and with a blade-guiding cutting slot intersecting said groove, so that a blade moved along the slot will cut a tape located in said groove. A pair of clamping toggles is arranged on this base. These toggles are spaced longitudinally of the grooves and are located at opposite sides of the intersection between the blade-guiding slot and the groove. Each of these toggles has at least one arm provided with a tape-clamping portion. Mounting means are provided for mounting each of the toggles tiltably on the base. The toggles may be tilted between a first and a second position. In the first of said positions, the clamping portion is brought into the groove and clamps a tape inserted thereinto, and in the second position, the clamping portion is withdrawn from the groove.

These fixing means are cavities and projections.

The novel features which are considered as characteristic for the present invention are set forth, in particular in the appended claims. The invention itself, however, both insofar as its construction and its method of operation are concerned, together with additional objects and advantages thereof, will be best understood from the following description of specific embodiments when read in connection with the accompanying drawings.

DESCRIPTION OF THE PREFERRED EMBODIMENTS

Figure 1:
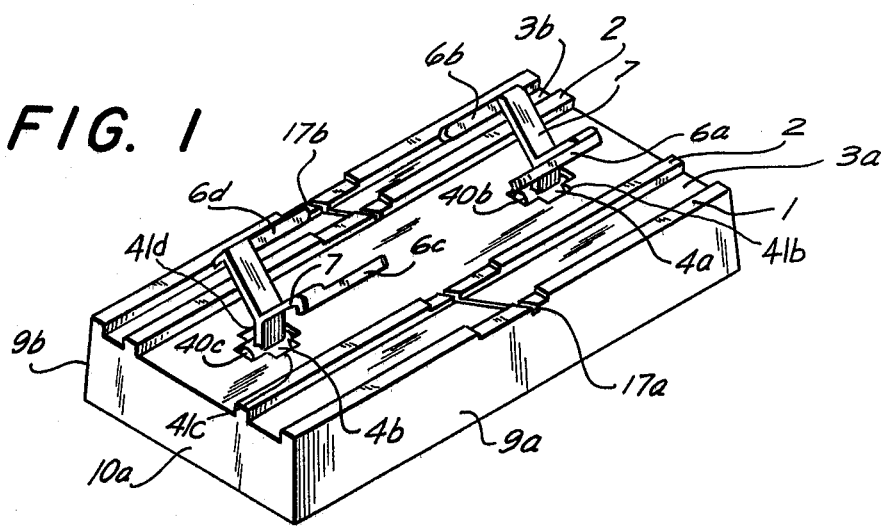
FIG. 1 is a top perspective view of one embodiment of a tape splicer according to the present invention.

FIG. 1 illustrates a tape splicer of the invention in a perspective view. A cutting plate 1 is shown to have quadrangular regular form. Two longitudinal walls 9a and 9b, a front wall 10a and a rear wall 10b extend downwardly from this plate 1.

Two pairs of longitudinal ribs 2 are integral with the plate 1 and project upwardly therefrom. These ribs 2 are spaced from the edges of the plate 1. The ribs 2 of each pair delimit between themselves respective grooves 3a and 3b extending longitudinally of the plate 1. The ribs 2 are spaced from one another by different distances in each pair so that the two grooves 3a and 3b have different widths, each of these grooves being available for splicing therein a tape of a width corresponding substantially to the groove width. In consideration of the standarized widths of tapes for tape recorders the grooves 3a and 3b may have a width of ¼ inch and 0.150 inch, respectively, although grooves of other widths may be used for other tapes, for example movie films or the like.

Through each of the grooves 3a and 3b, and through each of the ribs 2 delimiting these grooves, a blade-guiding slot 17a and 17b passes, each of these slots partially penetrating into the thickness of the plate 1. The blade-guiding slots 17a and 17b are shown as intersecting the ribs 2 and the grooves 3a and 3b at a sharp angle. This positioning of the slots provides for improved conditions of the cutting operation performed on the tapes.

In the central area located between the innermost ribs 2, a pair of tape clamping toggles 4a and 4b is mounted on the plate 1. These toggles 4a and 4b are illustrated as each having an axle 40a and 40b, a pair of angularly spaced arms 7 and a tape clamping means 6a, 6b, 6c and 6d extending lengthwise of the surface of plate 1. The exles 40a and 40b are shown as being cylindrical, partially recessed in the plate 1 and also extending lengthwise of the longitudinal axis of the plate 1. Longitudinal slots are formed in the plate 1 to form seats for the toggle axes 40a and 40b. From both sides of these slots, transversely curved peripheral lips 41c, 41d; 41b and the non-illustrated lip 41a opposite 41b extend on the upper surface of the plate 1 and partially overlap the cylindirical surface of the axles, so that they keep the axles in position in the base 1. As shown in FIG. 1, a portion of each longitudinal side of the slots is formed as a recess capable of receiving a lower portion of an arm 7 of each toggle 4a, 4b. The recesses are formed by forming downwardly extending peripheral lips from the portion of the upper surface of the base corresponding to the recesses on each side of the slot. The formation of lips has the dual function of making recesses and keeping the axles in position. The axles are turnable about their longitudinal axes, so that the toggles 4a and 4b are tiltable to and from the surface of the plate 1. The toggles 4a and 4b are spaced transversely from one another and also longitudinally of the plate 1 in such a manner that each of them is located at one side of the blade-guiding slots 17a and 17b.

The clamping means 6a, 6b, 6c and 6d are positioned on the arms 7 of the toggles 4a and 4b so that, when the toggles are fully tilted to one or the other side, the clamping means enter one or the other of the grooves 3a and 3b and engage a tape located therein. Thus, tapes in the respective grooves 3a or 3b may be cut without any danger that the pressure of a blade passed through the tape and the guiding slot 17a or 17b might shift the tape or fold it into the slot.

Figure 2:
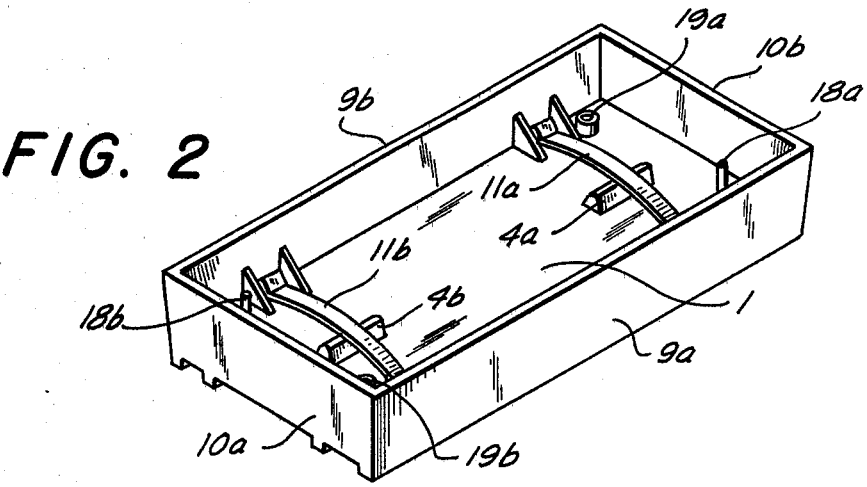
FIG. 2 is a bottom perspective view of the tape splicer illustrated in FIG. 1.

FIG. 2 shows a bottom perspective view of the tape splicer illustrated in FIG. 1.

In FIG. 2, the cylindrical axles 40a and 40b of the toggles 4a and 4b are shown as projecting from the plane of the inner surface of the plate 1. Across each of said axles, a leaf spring 11a and 11b is positioned, which spring is fixedly attached to the longitudinal walls 9a and 9b. Each of these leaf springs 11a and 11b is prestressed and contacts the cylindrical axle of one of the toggles 4a and 4b so as to bias the corresponding axle 40c and 40b against the peripheral lips bordering the slot which houses the respective axle.

Projections 18a and 18b in form of cylindrical rods are shown as extending from the inner surface of the plate 1. They are extended from the plate 1 substantially on its diagonal. Similarly, on the other diagonal of the plate 1, a pair of bosses 19a and 19b is provided. These are provided with holes sized to each frictionally receive one of the opposite projections 12a and 12b on a cover 16.

Figure 3:
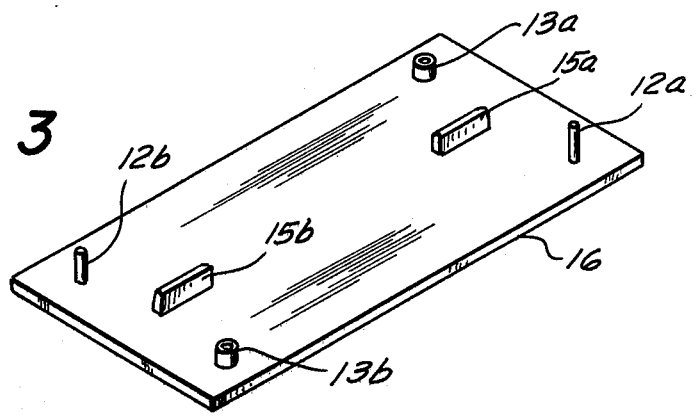
FIG. 3 is a perspective view of a cover fixable to the bottom side of the tape splicer in FIGS. 1 and 2.

FIG. 3 illustrates the cover 16 in a perspective view. The cover is engageable with the mentioned box-like configuration bounded by the plate 1 and by the walls 9a, 9b, 10a and 10b. The cylindrical rods or projections 12a and 12b extend upright from the inner surface of the cover 16. These rods 12a and 12b also are shown as extending on one diagonal of the cover 16. Bosses 13a and 13b, similar to those numbered 19a and 19b in FIG. 2, are illustrated as extending from the internal surface of the cover 16, and also as being provided on one diagonal of the cover 16. It is apparent that when the cover 16 is located on the bottom side of the mentioned box-like configuration, the projecting cylindrical rods 18a, and 18b illustrated in FIG. 2 will engage the holes in the bosses 13a and 13b, respectively shown in FIG. 3 as also the rods 13a and 13b will engage the bosses 19a and 19b on the inner side of the plate 1. By this engagement, the cover will be firmly assembled with the above described box-like configuration and will form therewith a closed box wherein the interior components of the tape splicer will be protected from any external influences.

With the possible exception of the springs 11a, 11b, all components of the novel splicer may be made of synthetic plastic material, e.g., PVC, nylon or the like, and formed by injection molding.

While the invention has been illustrated and described as embodied in FIGS. 1 to 3, it is not intended to be limited to the details shown, since various modifications and structural changes may be made without departing in any way from the spirit of the invention.

It will be understood that each of the elements described above, or two or more together, may also find a useful application in other types of devices and/or arrangements differing from the tape splicer described above.

Without further analysis, the foregoing will so fully reveal the gist of the present invention that others can, by applying current knowledge, readily adapt it for various applications, without omitting features that, from the standpoint of prior art, fairly constitute essential characteristics of the generic or specific aspects of this invention and, therefore, such adaptations should, and are intended to, be comprehended within the meaning and range of equivalance of the following claims.

What is claimed as new and desired to be protected by Letters Patent is set forth in the appended claims:

1. A tape splicer, comprising a base; at least one pair of parallel ribs extending longitudinally along said base and delimiting therebetween on said base at least one positioning groove for a tape; a blade-guiding cutting slot intersecting said ribs and a portion of the thickness of said base and a pair of bistable clamping toggles spaced laterally of said groove and longitudinally along said base on opposite sides of the intersection between said slot and said groove and tiltable onto said base, said toggles having a longitudinally extending anchoring axle embedded in said base, arm means extending substantially perpendicularly from said axle and an elongated clamp means provided at the end of said arm means and extending parallel with said base, said toggles being movable between a first stable position in which said clamp means reaches into said groove and engages a tape inserted in said groove to damp motion of said tape during its splicing in the area of said slot, and a second stable position in which the clamp means is withdrawn from said groove.

2. A tape splicer as defined in claim 1, wherein a pair of said grooves delimited by said longitudinal ribs and including said slot is provided, the one and, the other of said grooves being located adjacent the one and the other of the two opposite borders of said base, each of said toggles being provided with a pair of arms extending in angular relationship between each other from said axle and each of said arms being provided with said elongated clamp means each of which clamping means reaches into one of said grooves; and said toggles are tiltable into said first position and into a third position to engage by one of said clamp means a tape located in the one or the other of said grooves.

3. A tape splicer as defined in claim 2, wherein said longitudinal ribs delimiting the one and the other of said grooves have different spacing therebetween for enabling tapes of two different breadths to be spliced in the one and the other of said grooves.

4. A tape splicer as defined in claim 3, wherein said slot extends in direction askew to said groove.

5. A tape splicer as defined in claim 3, wherein one of said grooves is ¼ inch wide and the other of said grooves is 0.150 inch wide, so that tapes of these breadths may be spliced in the one and the other of said grooves.

6. A tape splicer as defined in claim 5, wherein said base is planar and quadrangular and is provided around its periphery with walls extending downwardly therefrom and thus forms a box-like configuration having two longitudinal walls and two parallel front and rear walls.

7. A tape splicer as defined in claim 6, wherein a cover is provided for closing said box-like configuration from beneath.

8. A tape splicer as defined in claim 7, wherein said base is provided with a pair of spacedly arranged longitudinal slots having retaining peripheral lips adjacent the upper surface of said base and having a length substantially corresponding to that of said axles, said axles being located in these slots and springing means being provided inside said box-like configuration opposite, and in engagement with, said axles, said springing means being prestressed for urging said axles into position against said peripheral lips.

9. A tape splicer as defined in claim 8, wherein said springing means are a pair of leaf springs, each of which springs is affixed in position underneath said base and is adapted to bias one of said axles against said lips.

10. A tape splicer as defined in claim 9, further comprising support ribs on said cover opposite said leaf springs to keep said springs in engagement with said axles.

11. A tape splicer as defined in claim 10, further comprising fixing means arranged to enable assembly of said box-like configuration with said cover.

12. A tape splicer as defined in claim 11, wherein said fixing means are cavities and projections opposite said cavities provided on the internal surfaces of, respectively, said base and said cover, so that said cover may be attached to said base by engagement of said cavities with said projections.

13. A tape splicer, comprising a base having a surface formed with a tape receiving groove and with a blade-guiding cutting slot intersecting said groove so that a blade moved along said slot will cut a tape located in said groove; and two spaced clamping arrangements each comprising a clamping member located above said base and mounted for movement between a clamping position in which said clamping member clamps a tape located in said groove and a withdrawn position in which said clamping member is withdrawn from said groove; and clamping-force generating means connected to said clamping member and located beneath said base so as not to interfere with tape splicer operations being performed above said base.

* * * * *